April 21, 1936.  H. V. DYKE  2,037,855
CATTLE CONTROLLER
Filed March 2, 1933
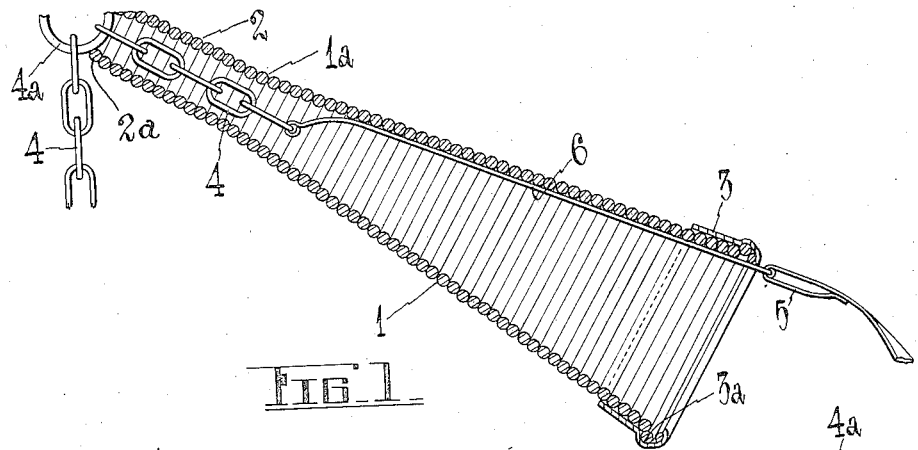
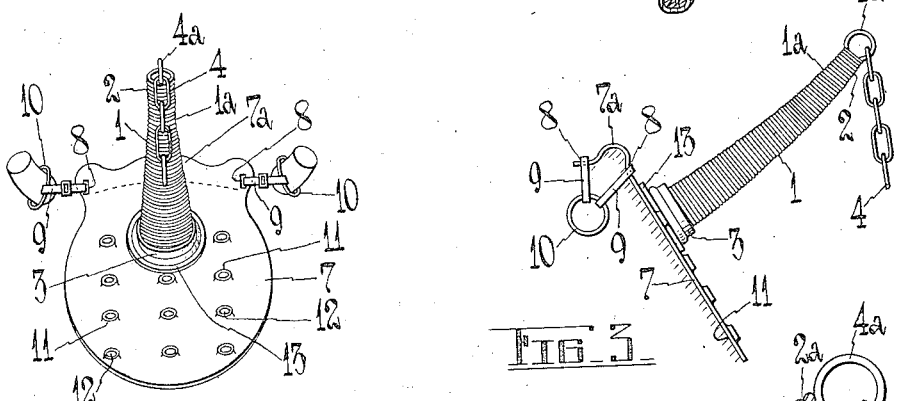
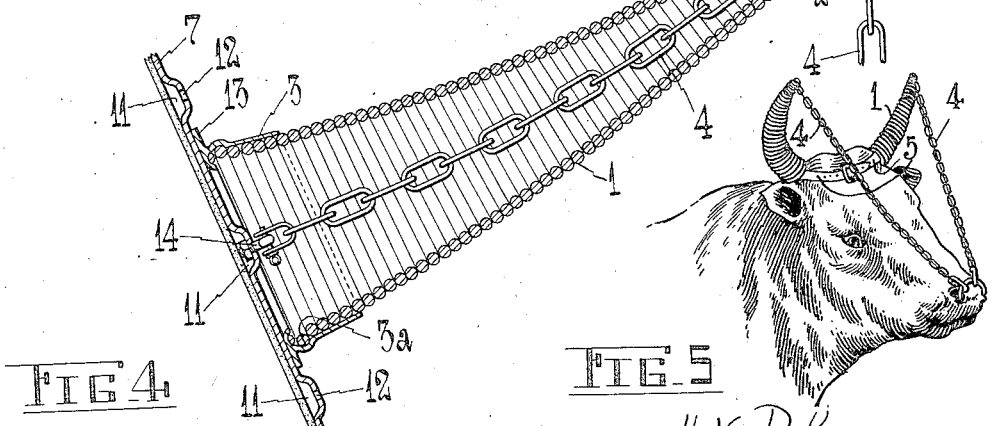
H. V. Dyke
INVENTOR
By: Marks & Clark
ATTYS.

Patented Apr. 21, 1936

2,037,855

UNITED STATES PATENT OFFICE 2,037,855

CATTLE CONTROLLER

Henry Vincent Dyke, Auckland, New Zealand

Application March 2, 1933, Serial No. 659,389
In New Zealand April 23, 1932

6 Claims. (Cl. 119—144)

This invention relates to devices used to facilitate the control of cattle in order to reduce the ability of the latter to do harm or mischief to human beings, other animals, gates, fences or other property.

The invention relates particularly to that type of device comprising a coiled conical spring or sheath adapted to be secured upon a horn or a stump thereof, and has for its object the provision of improvements designed to increase the efficiency of the device for the purpose for which it is intended, besides rendering it practically indestructible when subjected to ordinary usage.

The improved device provided by this invention comprises a sheath formed of semi-flexible material, given a conical formation to a point a short distance from its outer end, from which point said sheath is cylindrical, the outer end of the cylindrical portion being slightly rounded.

In order to guard against undue extension of the sheath when given a coiled spring formation, the chain or the like used for connecting the members of a pair of said sheaths to the nose ring on the animal and also together or to a fitting secured on the animal, is provided with stops located one outside the outer end of each sheath.

A further improvement resides in the provision of a plate to which one or a plurality of sheaths can be secured for use on dehorned animals.

The above mentioned and other improvements comprised in the invention will, however, be more particularly described with reference to the accompanying drawing wherein:

Figure 1 is a sectional elevation of the improved device,

Figure 2 a front view of the device including a plate for use on a dehorned animal, Figure 3 a side view of said device including a plate for use on dehorned animals, Figure 4 is an enlarged vertical section of a portion of Figure 2 with the sheath disposed on a lower portion of the plate, and Figure 5 is a view showing one form of the device applied to an animal.

Referring to the drawing 1 is the sheath which can be formed of any semi-flexible material, although it is preferred to form same of coiled spring wire, given a conical formation, to a point 1ᵃ a short distance from its outer end, the portion 2 of the sheath from the point 1ᵃ to said outer end being cylindrical.

Further, in order to give the extreme end of the sheath a slightly inwardly rounded formation, the coils 2ᵃ at the extreme outer end of the sheath are made of slightly less diameter than the other coils of the cylindrical portion 2.

The cessation of the conical formation or taper of the sheath 1, at a point a short distance from the outer end of the sheath, and the cylindrical formation of the remainder 2 thereof prevents the sheath from passing too far on to the horn, so as to ensure there being provided beyond the end of the latter a less flexible portion, with which it is not possible for an animal to do serious damage. When the device is placed on a horn, it serves as a guard with a flexible point which bends or doubles when pressed against anything with the obvious result that the horn is rendered largely incapable of doing serious damage and when secured on a dehorned animal the device serves as a flexible buffer between the animal and the object attacked, the buffer absorbing or neutralizing most of the force of the attack. In both cases with the device connected to the nose ring of the animal bending or doubling of the flexible end will cause the animal pain and thereby produce an incentive to desist in subsequently attacking. At the inner or wide end of the sheath 1, the latter is fitted with a sleeve or ring 3 tapered to closely fit on the sheath and embrace or grip several coils thereof for the purpose of reinforcing the base of the sheath, said tapered sleeve or ring 3 having at its greatest diameter an enlarged portion which contains an internal circular groove 3ᵃ.

The sleeve or ring 3 is adapted to screw on to the wide end of the coiled conical formation and when in proper position thereon more than a full coil of the coiled conical formation snaps into the circular groove 3ᵃ and remains therein, as the result of which it is not possible to remove the tapered sleeve or ring 3 from the sheath 1 by merely reversing the screwing on operation.

When a pair of sheaths 1 as above described are used on a pair of horns, the members of the pair are connected together by a chain 4 or the like, passed through or secured to a nose ring on the animal on which the sheaths 1 are used, and inwards through the outer or smaller ends of the sheaths to be connected with one or more straps or the like 5 at the wide ends of the coiled conical formations, said straps or the like 5 being located between the horns of the animal and passed behind or in front of the horns in order to secure and retain the sheath 1 in position on the animal.

In order to economize space in the sheaths 1, the chain 4 can be connected to looped wires, flat straps or the like 6 located inside the sheaths, the securing and retaining strap or straps 5 being connected to the wires or straps or the like 6.

At suitable points on the connecting chain 4 stops 4a such as rings or the like of suitable size are provided to guard against the sheaths 1 being strained by being unduly extended.

Although it is preferred to use chains to connect the coiled sheaths 1 to each other, and to the nose ring, other flexible connecting means may be employed.

In order to provide for the attachment of the improved device to dehorned animals, there is provided a plate 7 adapted to lie against the upper portion of the animal's forehead and shaped at 7a to fit over and behind the bridge between the horn stumps, said plate 7 being padded if necessary with leather or other suitable material to prevent undue discomfort to and chafing of the animal.

The portion 7a of the plate 7 fitting over and behind said bridge contains holes 8 through which are attached to the plate by chains and shackles, straps, or the like 9, rings 10 adapted to be placed on the horn stumps so that by tightening said chains, straps or the like 9, the plate 7 can be securely retained on the animal's head.

The plate portion extending down the front of the forehead carries the coiled sheaths 1 before described the sheaths being formed with a slightly upwardly curved formation, there being secured on the plate 7 one or more of said sheaths 1 as circumstances may warrant.

In order to provide for attachment of the sheaths 1 as required, the plate portion extending down the front of the forehead is provided in its rear surface with a central and two side vertical grooves or recesses or a central and two side vertical series of indentations or recesses 11, said grooves or recesses each containing a hole 12 which opens through the front of the plate 7. This plurality of openings 12 in the plate 7 allow of adjustments of the sheath with respect to the plate 7 and therefore with respect to the heads of animals when the heads vary in shape and the device must be lowered or raised or placed more to one side than to the other. Again, in some cases it is desirable to secure more than one device to a single plate and here also latitude must be allowed in varying the positions of the devices.

The reinforcing sleeves or rings 3 secured on the wide ends of the sheaths 1 are provided with circular flanges 13 through which they may be riveted or otherwise fastened to the plate in order to secure a sheath thereto over a hole 12.

The connecting chains, straps or the like 4, are provided with stops 4a, and are the same as before described, except that their ends instead of being connected together by a strap or straps 5 passing behind or in front of the horns, are attached to eye bolts 14 or other fastenings passed through holes 12 covered by the sheaths 1, the grooves, recesses or indentations 11 in the plate accommodating the heads of the fastenings 14 so that they do not project from the rear surface of the plate 7.

The sheaths 1 may be of coiled spring formation, or of reinforced rubber, or other suitable flexible or semi-flexible material, either used alone, or having the coiled spring formation embedded therein or otherwise combined therewith.

What I do claim and desire to obtain by Letters Patent of the United States of America is:—

1. A device for the purpose specified comprising a plate, a flexible resilient sheath secured on the plate, said plate being formed to seat on the bridge between the horn stumps of an animal and to lie against the forehead thereof, substantially as described and illustrated.

2. A device for the purpose specified as in claim 1, wherein said sheath is secured to the plate, and a reenforcing ring securing the wide end of the sheath to the plate, substantially as described and illustrated.

3. A device as claimed in claim 1, wherein the plate has a plurality of holes therein, a fastener inserted in one of said holes and a connecting device within the sheath for securing the sheath to the fastening device.

4. A device as claimed in claim 1, wherein the plate contains a plurality of series of holes and the plate has indentations, each hole being located in an indentation and a connecting device between the indented portion of the plate and the outer end of the sheath.

5. As an article of manufacture a resilient sheath formed from a single strand of wire coiled helically to form a tapered main portion, a cylindrical portion continuing from the small end thereof and a single coil of reduced diameter at the terminal of the wire said coils being in contact with adjacent coils in all positions that the sheath may assume when in use.

6. A device for the purpose specified, comprising a sheath of resilient material, formed with a tapered main portion, and a cylindrical portion having an outer end of reduced diameter, extending from the smaller end of said main portion; a flexible connecting device leading through the sheath from a fastening at the larger end of said main portion, adapted to be secured to the nose ring of an animal; and a stop on said flexible connecting device between the ends thereof and permanently bearing against the outer end of the sheath.

HENRY VINCENT DYKE.